United States Patent [19]

Baron et al.

[11] 4,221,892
[45] Sep. 9, 1980

[54] PHOTOCURABLE PARTIALLY ESTERIFIED POLYEPOXIDES

[75] Inventors: Lynne B. Baron, Framingham; George A. Lee, Wayland, both of Mass.

[73] Assignee: The Dow Chemical Company, Midland, Mich.

[21] Appl. No.: 965,216

[22] Filed: Nov. 30, 1978

[51] Int. Cl.² ............................................. C08L 63/00
[52] U.S. Cl. .............................. 525/531; 204/159.15; 525/530; 525/922
[58] Field of Search .......................... 260/836, 837 R; 525/530, 531

[56] References Cited

U.S. PATENT DOCUMENTS

| | | | |
|---|---|---|---|
| 3,301,743 | 1/1967 | Fekete | 260/837 R |
| 3,367,992 | 2/1968 | Beardem | 260/837 R |
| 3,637,618 | 1/1972 | May | 260/837 R |
| 3,971,834 | 7/1976 | Uxelmeier | 260/837 R |
| 3,991,028 | 11/1976 | Irwin | 260/837 R |
| 4,076,765 | 2/1978 | Nakahara | 260/837 R |
| 4,141,865 | 2/1979 | Bogan | 260/837 R |
| 4,151,219 | 11/1979 | Brewbaker | 525/531 |

*Primary Examiner*—Paul Lieberman

[57] ABSTRACT

An ultraviolet light curable resin composition comprises a mixture of entities including a polyepoxide, a partial or complete unsaturated ester of the same polyepoxide, and a partial or complete hydrolysis product of the same polyepoxide. This resin composition exhibits improved adhesion to metals.

6 Claims, No Drawings

PHOTOCURABLE PARTIALLY ESTERIFIED POLYEPOXIDES

BACKGROUND OF THE INVENTION

Cured polyepoxides have many desirable properties such as solvent and chemical resistance and firm adhesion to metal substrates. The more recently developed class of vinyl ester resins result from reaction of a polyepoxide and an unsaturated monocarboxylic acid also possess many worthwhile properties, but these latter resins often do not give optimum adhesion to metal (particularly aluminum and tin free steel).

Many formulations have been described in the literature that purport to improve the properties of resins such as the vinyl ester resins.

Those prior reaction products exhibit improved adhesion over prior known compositions. However, all require multicomponent reaction mixtures increasing the complexity of the reaction and the prepared products. Also, the reaction products still leave room for improvement of adhesion to metals.

SUMMARY OF THE INVENTION

The present invention is directed to a radiation curable resin composition composed of a mixture of compounds containing terminal unsaturation, oxirane groups and terminal glycol groups.

DETAILED DESCRIPTION OF THE INVENTION

The curable resin composition is prepared by contacting a polyepoxide, an ethylenically unsaturated monocarboxylic acid and water in certain ratios as will be defined.

Any of the known polyepoxides can be employed in the preparation of the resin composition. Useful polyepoxides are glycidyl polyethers of both polyhydric alcohols and polyhydric phenols, epoxy novolacs, epoxidized esters of fatty acids or drying oils, epoxidized polyolefins, epoxidized di-unsaturated acid esters, epoxidized unsaturated polyesters and mixtures thereof so long as they contain more than one epoxide group per molecule on an average. The polyepoxides may be monomeric or polymeric.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups. Other polyfunctional reactants include diisocyanates, dicarboxylic acid anhydrides and those reactants which contain functional groups which will react with the epoxide group. Also, the polyepoxide may contain bromine or other substituents on the molecule, particularly substituted on the aryl group of a polyhydric phenol used in making the polyepoxide.

Where polyhydric phenols are selected to prepare the polyepoxide many structural embodiments are possible. Polyepoxides prepared from polyhydric phenols may contain the structural group:

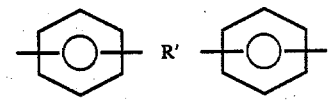

wherein R' is a divalent hydrocarbon radical such as: —CH$_2$—, —CH$_2$CH$_2$—,

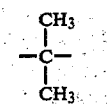

and the like or R' is: —S—,

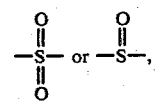

or —O—.

Another class of polyhydric phenols is the novolacs wherein phenols or substituted phenols are linked together with a methylene group.

The choice of novolac resins leads to a separate, well-recognized class of epoxy novolac resins.

Other modifications are well known to those skilled in the art.

The polyepoxides referred to as epoxidized diolefins, epoxidized esters of fatty acids, etc., are generally made by the known peracid method where the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene polymers, ethyl linoleate, polyunsaturated drying oils or drying oil esters can all be converted to polyepoxides.

An additional preferred class of polyepoxides are epoxidized cycloolefins. These polyepoxides can be prepared by epoxidation of a cyclic olefinic material by known peracid methods.

While the invention is applicable to epoxy esters and alloys prepared from polyepoxides, generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

In addition to the epoxidic prepolymers discussed hereinabove, the epoxide materials include also, admixed therewith, an ester having two epoxycycloalkyl groups. Thus, a suitable ester of epoxidized cyclohexanemethanol and epoxidized cyclohexanecarboxylic acid is the diepoxide(3,4-epoxycyclohexyl)methyl 3,4-epoxycyclohexanecarboxylate; this same ester may be indexed under the name 7-oxabicyclo[4.0.1]hept-3-ylmethyl 7-oxabicyclo[4.0.1]heptane-3-carboxylate, and has the formula:

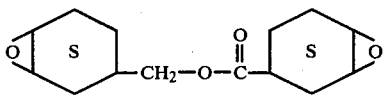

Another suitable ester having two epoxycycloalkyl groups may be obtained as an ester of an alkyl-substituted (epoxycycloalkane)methanol and a dibasic acid, for example, bis[(3,4-epoxy-6-methylcyclohexyl)methyl]adipate, which may be named alternatively bis[(4-methyl-7-oxabicyclo[4.1.0]hept-3-yl)methyl]adipate, and which has the formula:

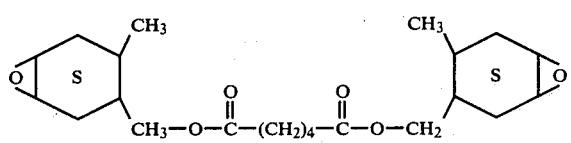

Ethylenically unsaturated monocarboxylic acids suitable for reaction with the polyepoxide include the $\alpha,\beta$-unsaturated monocarboxylic acids including, for example, acrylic acid, methacrylic acid, crotonic acid, cinnamic acid and the like.

Also useful as the unsaturated monocarboxylic acids are the hydroxyalkyl acetate or methacrylate half esters of dicarboxylic acids. The hydroxyalkyl groups of the half esters preferably contain from two to six carbon atoms and include such groups as hydroxyethyl, beta-hydroxypropyl, beta-hydroxybutyl and the like. It is also intended to include those hydroxyalkyl groups in which an ether oxygen is present. The dicarboxylic acids can be either saturated or unsaturated. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acid, itaconic acid, halogenated maleic or fumaric acids, mesaconic acid and the like. Mixtures of ethylenically unsaturated carboxylic acids may be used.

Another essential component in the preparation of the resin compositions is water to hydrolyze some of the oxirane groups to a glycol functionality. This glycol moiety in the composition is essential to attainment of the exceptional adhesion of the composition to metals.

The reactants can be varied within relatively wide ratios to achieve a compositional mixture meeting the objectives of the invention. The unsaturated acid should be present in an amount of 10 to 90 mole percent based on the moles of polyepoxide. Preferably that amount should be from 40 to 80 mole percent with the optimum amount at 50-70 mole percent. The water present in the reaction mixture should be at least about 0.6 equivalents per equivalent of oxirane groups. Larger amounts of water than about 1.6 equivalents may be used but will generally require the removal of excess water from the final product. The use of less water than 0.6 equivalents produces insufficient hydrolysis to provide a resin mixture having the desired level of glycol groups. The remainder of the oxirane groups will remain unhydrolyzed.

The reaction is conducted in the presence of a catalyst such as an alcoholate, sodium carboxylate, phosphonium, ammonium or arsonium salts, a tertiary amino phenol or a trivalent chromium salt. Although the catalyst may be varied within wide limits as, for example, from $2 \times 10^{-3}$ to $4.5 \times 10^{-4}$ moles chromium triacetate, the optimum concentration is between 0.3 to about 0.35 millimoles of trivalent chromium or its equivalent of other catalyst per equivalent of epoxide.

The reaction can be run within a wide range of reaction temperatures such as from 90°–140° C. A generally optimum range for acceptable reaction time and product distribution is from about 100° C. to 125° C. Lower temperatures result in unnecessarily long reaction times.

Judicious selections of such parameters will be easily made by the skilled worker to provide optimum reaction rates and products.

Typically, the reaction product will be a mixture of components of (1) compounds containing the same functional moiety and (2) compounds having one each of two functional groupings as above described. For example, in a reaction of the diglycidyl ether of bisphenol A, acrylic acid and water, the following six compounds would be present:

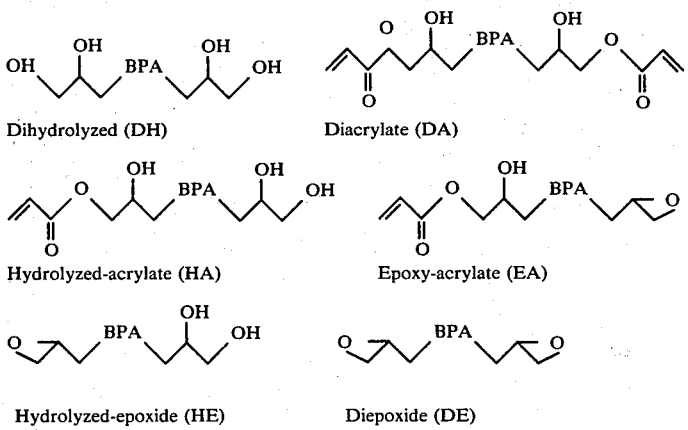

Dihydrolyzed (DH)  Diacrylate (DA)

Hydrolyzed-acrylate (HA)  Epoxy-acrylate (EA)

Hydrolyzed-epoxide (HE)  Diepoxide (DE)

The concentration of each of the species in the mixture may be varied within wide limits. It appears that the hydrolyzed acrylate and hydrolyzed epoxide must be present in significant amounts to attain a full spectrum of good properties. A laboratory mixture prepared from the dihydrolyzed species, the diacrylate and the diepoxide, each species having been previously prepared separately, did not result in a product with good properties. When the reactant proportions as outlined above are utilized, a suitable mixture of the various species is produced to provide a product with desirable properties.

Alternatively, a useful product can be prepared by blending the diacrylate, and epoxyacrylate and/or diepoxide species and partially saponifying the acrylate groups of that mixture.

For use in coating formulations, the reaction product may be blended with a reactive diluent which is usually an ethylenically unsaturated monomer that is copolymerizable with that product.

A wide selection of copolymerizable monomers containing the $>C=CH_2$ group is available for use as the reactive diluent. Representative species include styrene, vinyl toluene and the esters of acrylic and methacrylic acids; such as butyl, 2-ethylhexyl, phenoxyethyl, dicyclopentyl, tetrahydrofurfuryl and benzyl esters. Also included are vinyl acetate, diallyl maleate, dimethallyl furmarate and vinyl carboxylic acids; such as the half ester of 2-hydroxyethyl acrylate and a dicarboxylic acid.

Preferred as reactive diluents are the acrylic and methacrylic esters of saturated alcohols and the hydroxyalkyl esters.

The compositions of this invention are curable upon exposure to actinic light of ultraviolet or visible wavelength. Suitable sources include, but are not limited to, carbon arcs, mercury vapor arcs, pulsed xenon lamps, fluorescent lamps with special ultraviolet light emitting phosphors, argon glow lamps and others that are well known.

To be curable at an acceptable rate by actinic radiation requires the incorporation of a photoinitiator in the formulation. Because the mixture contains both olefinic unsaturation and oxirane groups, it is most advantageous to have a photoinitiator that will function both as a free radical initiator and as an ionic catalyst precursor. Basically such compounds or blends of compounds under actinic exposure form free radicals and also generate a hydrohalide.

Typical of such catalysts is p-tert-butyl-$\alpha,\alpha,\alpha$-trichloroacetophenone. Also such catalyst systems as those described in U.S. Pat. No. 4,069,054 are bifunctional in this manner. Those systems are an aromatic sulfonium compound sensitized with an aromatic tertiary amine or an aromatic polycyclic compound, all as further defined in the patent. Those teachings are incorporated herein by reference.

Also conventional benzoin ether photoinitiators used in conjunction with halogenated solvents will result in sufficient HCl generation to result in products meeting the objectives of the invention.

Catalysts which only generate free radicals under light exposure will produce hard, tack-free coatings, but such coatings will usually result in coatings that are somewhat deficient in adhesion and one or more properties.

The compositions are fabricated into the desired shape as, for example, by casting or otherwise applying a coating onto a substratum. After shaping, the uncured composition is exposed to a light source to cause polymerization. The light source can be any ultraviolet actinic radiation such as that produced from a mercury, xenon or carbon arc lamp. The compositions are well adapted to imaging processes, wherein parts of the uncured coating are masked and then exposed to the radiation source so that only those exposed portions are cured. The unexposed parts remain uncured and can be washed away with suitable solvents to leave a reversal image.

These compositions usually exhibit excellent adhesion to such substrates with only an actinic radiation cure. This adhesion is obtained without sacrificing the other superior chemical and physical properties of such systems. In addition to overcoming the problems associated with acrylic systems, the compositions of this invention overcome difficulties associated with curing thick sections of epoxies. Although generally useful coatings are obtained without a thermal post baking step, there are some compositions, particularly with certain reactive diluents, where that step is important to achieve optimum adhesion. When those reactive diluents are employed with other resins than those of this invention, adhesion is not obtained even with a thermal post bake.

The invention will be more apparent from the following illustrative examples.

EXAMPLE 1

A resin composition was prepared by mixing together 250 grams (1.35 moles) of a diglycidyl ether of bisphenol A (EEW = 180 to 185; 23 percent epoxy content), 37 milliliters (0.54 mole) acrylic acid, 0.5 gram ($4.5 \times 10^{-3}$ moles) hydroquinone and 0.5 gram ($4.0 \times 10^{-3}$ moles) p-methoxyphenol. The mixture was made in a three-neck 500 milliliter round bottom flask equipped with an overhead air driven stirrer, a reflux condenser and a thermometer. When the contents had been thoroughly mixed, a catalyst solution composed of 0.65 gram ($1.1 \times 10^{-3}$ moles) basic chromium acetate and 40 milliliters (2.2 moles) water was added. The mixture was heated at 110° C. for 3.5 hours after which the resin was sparged with nitrogen for 1 hour at 110° C.

A portion of the above resin (0.4995 gram) was mixed with 0.4985 gram dicyclopentadiene acrylate and 0.0312 gram p-tertbutyl-$\alpha,\alpha,\alpha$-trichloroacetophenone (Trigonal P-1). The mixture was spread on Parker aluminum panels with a No. 7 Meyer wire wound rod and cured by passing under a 200 watt per linear inch Hanovia mercury arc lamp at a rate of 100 feet per minute. After 10 passes, the coating had become tack free.

The panels were tested for adhesion by scratching 10 straight lines across the panel and 10 lines at right angles to provide 100 squares. Strips of No. 610 Scotch brand tape were stuck to the coating and pulled away from the coating. The number of squares without any coating removed is the precentage adhesion.

When so tested, the composition of this example showed 100 percent adhesion.

EXAMPLE 2

A series of reaction products were made according to the method of Example 1 but varying the catalyst concentration and water level. The reaction time was determined by determining the percent carboxyl in aliquots withdrawn from the reaction mixture. The reaction was considered complete when the percent carboxyl was less than one percent. At that time, the mixture was sparged with nitrogen for an additional hour.

Some samples were blended with dicyclopentadiene acrylate, others with phenoxyethyl acrylate in a 1 to 1 ratio with the resin. All were cast as coatings on Parker aluminum panels and cured as per the previous example. Adhesion was measured with the described cross-hatch test. The results are shown in Table 1. In the table the percent of each of the components in the reaction product was determined by liquid-liquid chromatography.

TABLE 1
PRODUCTS FROM REACTION OF 1 EQUIVALENT EPOXY RESIN WITH 0.6 EQUIVALENT ACRYLIC ACID

| $\left(\dfrac{\text{H}_2\text{O Conc. mole H}_2\text{O}}{\text{Equiv. Epoxide}}\right)$ | Reaction Time (Hrs.) | DH (%) | HA (%) | HE (%) | DA (%) | EA (%) | DE (%) | Cure Speed[1] (Monomer) | Percent Adhesion Immed. After | 24 Hrs. After | Post-bake 165°/2 min. |
|---|---|---|---|---|---|---|---|---|---|---|---|
| 1.62 | 7.5 | 20.5 | 47.7 | 2.2 | 29.0 | 2.6 | — | 3 (DCPDA) | 100 | 100 | 100 |
|  |  |  |  |  |  |  |  | 5 (EPhA) | 80 | 100 | 100 |
| .81 | 4.5 | 4.1 | 18.1 | 6.9 | 34.5 | 29.6 | 6.8 | 4 (DCPDA) | 15 | 98 | 100 |
|  |  |  |  |  |  |  |  | 5 (EPhA) | 0 | 0 | 100 |
| .81 | 4.0 | 4.8 | 19.5 | 8.9 | 37.4 | 24.6 | 4.7 | 4 (DCPDA) | 100 | 100 | 100 |
|  |  |  |  |  |  |  |  | 5 (EPhA) | 100 | 100 | 100 |
| .41 | 2.5 | 1.3 | 8.0 | 4.0 | 33.4 | 41.1 | 12.2 | 4 (DCPDA) | 0 | 50 | 100 |
|  |  |  |  |  |  |  |  | 5 (EPhA) | 0 | 25 | 100 |

[1]Number of passes under 200 w/Lin. inch Hg arc lamp at 100'/min. to develop mar-free surface
In the first two listed samples catalyst conc. was 0.62 moles Cr(OAc)$_3$/eq. epoxide; in last two samples conc. was 0.31 Cr(OAc)$_3$/eq. epoxide.

EXAMPLE 3

Compositions were prepared from a composition from a diglycidyl ether of bisphenol A having an epoxy equivalent weight of 180 to 185 and a viscosity of about 10,000 centipoises and acrylic acid. The amount of acid was varied to provide different levels of ester content in the product.

About 1 equivalent of water per equivalent of oxirane was used. That included the water from the addition of 0.12 percent of 33 percent aqueous chromium chloride.

The resin was prepared as in Example 1. Samples of the resin were mixed to provide a 50 percent resin mixture with either dicyclopentadiene acrylate or phenoxyethyl acrylate as reactive diluents and p-tertbutyl-α,α,α-trichloroacetophenone as catalyst. The compositions were then coated on various substrata and exposed to ultraviolet light as in the previous examples. Some were given a thermal postbake at 160° C. The adhesion was evaluated as before.

The results are shown in Table II.

TABLE II
UV CURED COATING PROPERTIES OF HYDROLYZED RESINS

| | DCPDA[1] | | | | | EPh-A[2] | | | | |
|---|---|---|---|---|---|---|---|---|---|---|
| Resin (% Acrylated) | 60% | 70% | 80% | 90% | 100% (XD-9002) | 60% | 70% | 80% | 90% | 100% (XD-9002) |
| Cure Rate | 4 | 4 | 3–4 | 3 | 3–4 | 4–5 | 3–4 | 3–4 | 3 | 3 |
| Reverse Impact | 20–30 | 40–50 | 30 | 50–60 | <10 | 80–90 | 60 | 50–60 | 40 | 30 |
| % Adhesion | | | | | | | | | | |
| Al (No Bake) | | | | | | | | | | |
| 1 Hour | 90 | 0 | 0 | 0 | 0 | 0 | 0 | 0 | 0 | 0 |
| 24 Hours | 100 | 100 | 97 | 97 | 0 | 0 | 0 | 0 | 0 | 0 |
| Al (160° C.) | | | | | | | | | | |
| 2 Minutes | 100 | 100 | 100 | 100 | 100 | 100 | 100 | 65 | 100 | 0 |
| 4 Minutes | — | — | — | — | — | — | — | 95 | — | 0 |
| ETP (No Bake)[3] | | | | | | | | | | |
| 1 Hour | 0 | 0 | 0 | 0 | 0 | 0 | 0 | 0 | 0 | 0 |
| 24 Hours | 0 | 0 | 0 | 0 | 0 | — | — | — | — | — |
| ETP (160° C.) | | | | | | | | | | |
| 2 Minutes | 100 | 100 | 100 | 100 | 100 | 70–80 | 20–30 | 0 | 0 | 0 |
| 4 Minutes | — | — | — | — | — | 100 | 25–30 | 20 | 0 | 0 |
| TFS (No Bake)[4] | | | | | | | | | | |
| 1 Hour | 0 | 0 | 0 | 0 | 0 | 0 | 0 | 0 | 0 | 0 |
| 24 Hours | 0 | — | — | — | — | 0 | 0 | 0 | 0 | 0 |
| TFS (160° C.) | | | | | | | | | | |
| 2 Minutes | 90–100 | 30–50 | 0 | 0 | 0 | 0 | 0 | 0 | 0 | 0 |
| 4 Minutes | — | 100 | 100 | 100 | 100 | 0 | 0 | 0 | 0 | 0 |

[1]50% DCPDA + 50% Resin
[2]45% EPH-A + 50% Resin
[3]ETP = Electro-Tin-Plate
[4]TFS = Tin-Free Steel

What is claimed is:

1. An ultraviolet radiation curable resin composition comprising a mixture of polymerizable entities including (1) a polyepoxide, (2) an epoxy ester resulting from partial or complete esterification of the epoxy groups of a portion of said polyepoxide with an unsaturated carboxylic acid and (3) a partially or completely hydrolyzed portion of said polyepoxide, said composition prepared by the process comprising the mixing of a polyepoxide, from 10 to 90 mole percent based on oxirane groups of an unsaturated monocarboxylic acid and at least 0.6 equivalent water per equivalent of oxirane groups, an addition polymerization inhibitor and a catalyst for the esterification reaction of carboxyl groups with oxirane groups and reacting the ingredients at elevated temperature under conditions to prevent loss of water until substantially all of said acid has been esterified and subsequently removing excess water.

2. The composition claimed in claim 1 wherein from 40 to 75 percent of the epoxy groups are esterified.

3. The composition claimed in claim 1 wherein said polyepoxide is the diglycidyl ether of a polyhydric phenol.

4. The composition claimed in claim 3 wherein said polyepoxide is the diglycidyl ether of bisphenol A.

5. The composition claimed in claim 1 wherein said carboxylic acid is acrylic acid.

6. A process for preparing an ultraviolet radiation curable resin composition, said process comprising the mixing of a polyepoxide, from 10 to 90 mole percent based on oxirane groups of an unsaturated carboxylic acid, at least 0.6 equivalent water per equivalent of oxirane groups, an addition polymerization inhibitor and a catalyst for the esterification reaction of carboxyl groups with oxirane groups; and reacting the ingredients at elevated temperature under conditions to prevent loss of water until substantially all of said acid has been esterified and oxirane groups hydrolyzed and subsequently removing the excess water.

* * * * *

UNITED STATES PATENT AND TRADEMARK OFFICE
CERTIFICATE OF CORRECTION

PATENT NO. : 4,221,892
DATED : September 9, 1980
INVENTOR(S) : Lynne B. Baron; George A. Lee It is certified that error appears in the above-identified patent and that said Letters Patent are hereby corrected as shown below:

Column 3, line 28, delete "acetate" and insert --acrylate--.

Column 5, line 16, delete "furmarate" and insert --fumarate--.

Column 6, line 48, delete "precentage" and insert --percentage--.

Column 7, Table I, line 2 of footnote, after "0.31" insert --moles--.

Signed and Sealed this

Twenty-fourth Day of February 1981

[SEAL]

Attest:

Attesting Officer

RENE D. TEGTMEYER

Acting Commissioner of Patents and Trademarks